United States Patent
Claassens et al.

(10) Patent No.: US 7,391,146 B2
(45) Date of Patent: Jun. 24, 2008

(54) HALOGEN INCANDESCENT LAMP

(75) Inventors: Jacobus Marinus Maria Claassens, Eindhoven (NL); Joseph Franciscus Raymond Eijsermans, Eindhoven (NL); Wilfried Ludwig Kohlmann, Aldenhoven (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 163 days.

(21) Appl. No.: 10/539,392

(22) PCT Filed: Nov. 27, 2003

(86) PCT No.: PCT/IB03/50026

§ 371 (c)(1),
(2), (4) Date: Jun. 15, 2005

(87) PCT Pub. No.: WO2004/057646

PCT Pub. Date: Jul. 8, 2004

(65) Prior Publication Data

US 2007/0138929 A1    Jun. 21, 2007

(30) Foreign Application Priority Data

Dec. 20, 2002    (EP) .................................. 02080526

(51) Int. Cl.
*H01J 5/48*    (2006.01)
(52) U.S. Cl. ................................... 313/318.07; 313/578
(58) Field of Classification Search .................. 313/578, 313/273, 279, 318.01–318.07

See application file for complete search history.

(56) References Cited

U.S. PATENT DOCUMENTS

| 2,924,735 | A | | 2/1960 | Martin |
| 3,007,074 | A | | 10/1961 | Swasey et al. |
| 3,743,375 | A | | 7/1973 | De Fraeye |
| 3,777,207 | A | * | 12/1973 | Notelteirs et al. ........... 313/578 |
| 4,074,167 | A | | 2/1978 | van den Broek et al. |
| 4,469,983 | A | | 9/1984 | Grahmann et al. |
| 5,500,566 | A | | 3/1996 | Talmon-Gros et al. |
| 5,659,222 | A | * | 8/1997 | Ragsdale et al. ............ 313/578 |
| 2002/0103069 | A1 | | 8/2002 | Young |

FOREIGN PATENT DOCUMENTS

| DE | 10112690 A1 | 9/2002 |
| EP | 0173995 A2 | 3/1986 |
| EP | 0357078 A2 | 3/1990 |
| JP | 3285255 | 12/1991 |
| JP | 07085846 A | 3/1995 |
| SU | 00760243 | 8/1980 |
| WO | 0149621 A1 | 7/2001 |
| WO | 02075778 A1 | 9/2002 |

* cited by examiner

*Primary Examiner*—Joseph Williams

(57) ABSTRACT

A halogen incandescent lamp has a transparent sealed bulb, a gas filling comprising an inert gas and a halogen additive, a luminous element which is attached to a current supply system extending in a pinched portion of the bulb, and a mount extending from at least adjacent the outside of the pinched portion into the bulb and comprising at least one metal support wire which retains the luminous element in the vicinity of the end of the bulb remote from the pinched portion. The mount has a non-conducting part such that the outer end of the part of the mount at or near the outside of the pinched portion and the support wire are electrically insulated from each other.

10 Claims, 4 Drawing Sheets

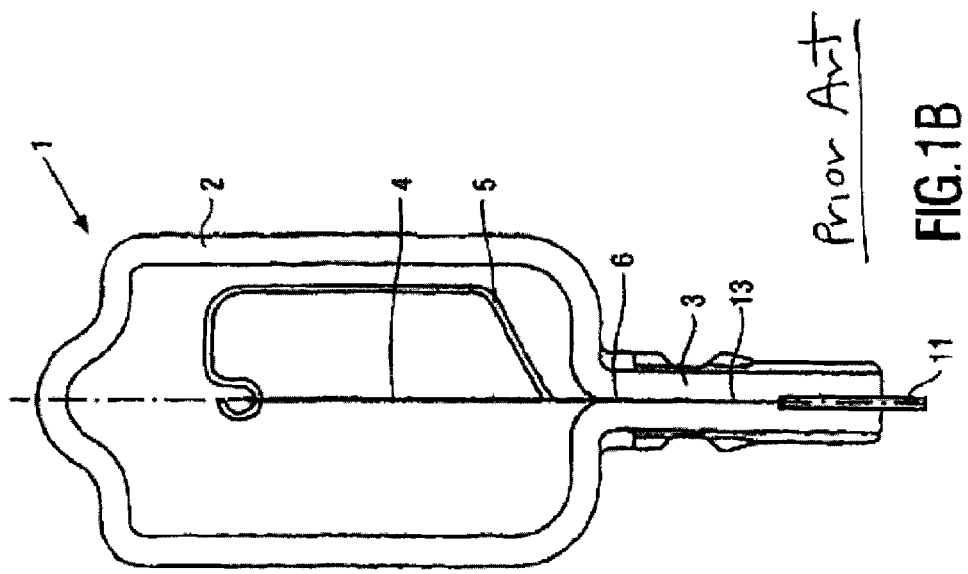
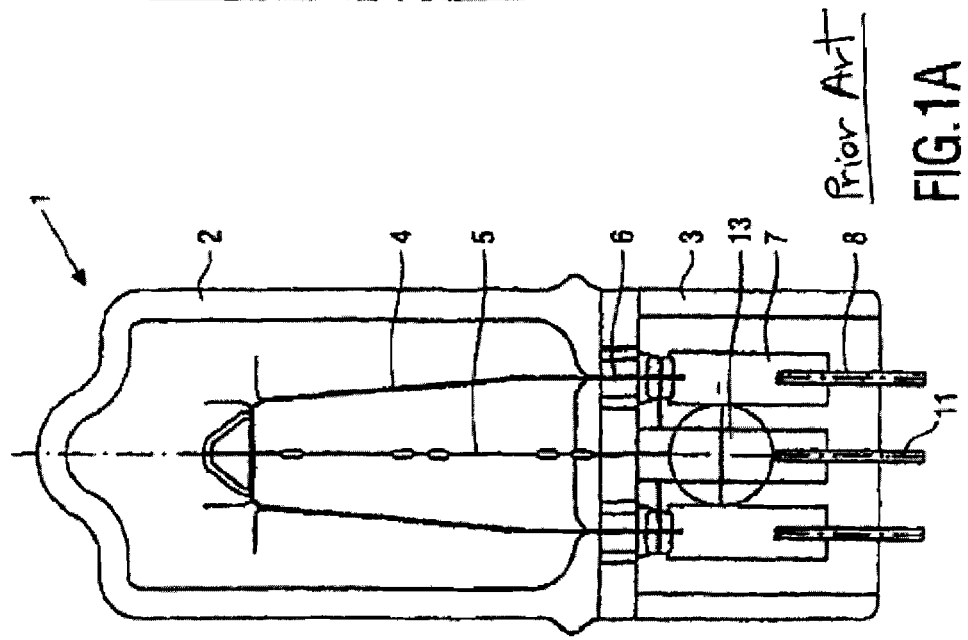
FIG. 1A Prior Art
FIG. 1B Prior Art

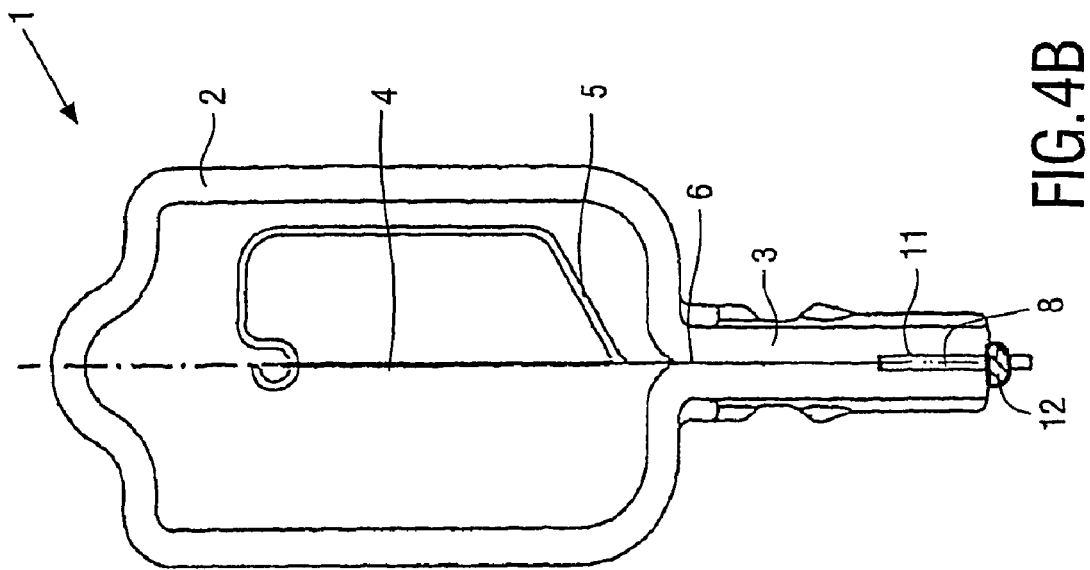
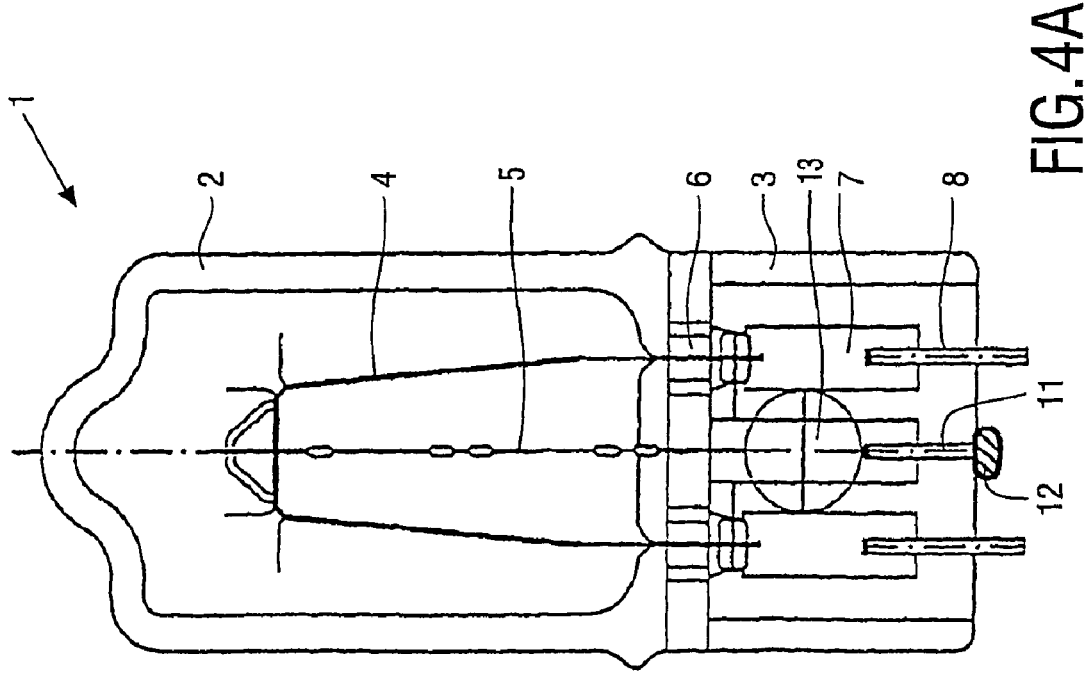
FIG. 4A
FIG. 4B

HALOGEN INCANDESCENT LAMP

The invention relates to a halogen incandescent lamp comprising a transparent sealed bulb, a gas filling comprising an inert gas and a halogen additive, a luminous element which is attached to a current supply system extending in a pinched portion of the bulb, and a mount extending from at least adjacent the outside of the pinched portion into the bulb and comprising at least one metal support wire which retains the luminous element in the vicinity of the end of the bulb remote from the pinched portion.

A lamp of this type is described in international patent application publication WO 02/075778. The length of the luminous element determines the power characteristics of the lamp, and in general it is desirable, therefore, to have the option to choose the length and (in relation therewith) the shape of the luminous element in dependence on the power of the lamp. The mount supporting the luminous filament of the known lamp consists of a bent metal support wire which is connected with electrical conduction to a central sealing foil, which in its turn is connected with electrical conduction to a center pin. The three interconnected parts (support wire, foil and center pin) are embedded in the pinched portion of the bulb, projecting at both sides thereof. The central portion of the luminous filament inside the bulb thus has a live electrical connection to the environment, which is unwanted in some applications, and can even be dangerous.

The object of the invention is to provide a reliable and efficient halogen incandescent lamp of the above-mentioned type, wherein the luminous filament in the bulb is supported in a stable manner by the metal support wire and/or wherein the luminous element can be arranged in many different shapes and lengths, and wherein there is no live connection from the luminous element to the environment, apart from the power supply system of the lamp.

In order to achieve the above objectives, the mount comprises a non-conducting part such that the outer end of the part of the mount at or adjacent the outside of the pinched portion and the support wire are electrically insulated from each other.

In a first preferred embodiment, the non-conducting part comprises a pedestal which is supported by the bulb or the pinched portion thereof, preferably at least partly extending into the pinched portion, and that the at least one metal support wire extends from the pedestal. In this manner it is possible to choose any number of support wires necessary for forming a luminous element of a required shape (for instance a V, U, or W shape, or even more complex three-dimensional shapes) or length. A compact lamp can thus be obtained having a sufficiently long luminous element.

Preferably, the pedestal comprises a rod or a capillary substantially extending in the pinched portion and a bead substantially extending inside the bulb. This renders it possible to insert the capillary part of the pedestal instead of the prior art center pin and feedthrough, while there is enough space in the extending bead for inserting a sufficient number of support wires in the required configuration, and changes to the currently used production methods are minimized. Preferably, the pedestal is substantially made of glass, preferably of the same kind as the bulb, for instance a hard glass or a quartz glass. If the bulb is made of quartz glass, more preferably, the glass is a quartz transition glass, which has good wetting and softening characteristics when the pedestal is heated for inserting the support wires and for embedding the pedestal in the pinched portion. In particular it is important that the thermo-mechanical properties of the pedestal, such as the coefficient of expansion, match those of the pinched portion. Preferably, the softening temperature of the pedestal is substantially lower than that of the pinched portion.

In a second preferred embodiment, the non-conducting part comprises a bead, preferably made of glass, more preferably made of a copper-based glass such as, for example, Corning™ batch 901ADY, which is applied to the outside of the pinched portion.

The invention also relates to a method of producing a lamp wherein the part of the mount which extends outside the pinched portion is substantially removed before the bead is applied to the outside of the pinched portion. The bead is preferably heated by IR radiation in order to apply the bead.

The invention will now be explained in more detail below with reference to the embodiments in the Figures. In the drawings:

FIG. 1a is a front elevation of a prior art halogen incandescent lamp;

FIG. 1b is a side elevation of the halogen incandescent lamp of FIG. 1a;

FIG. 2b is a side elevation of the halogen incandescent lamp of FIG. 2a;

FIG. 4a is a front elevation of still a further alternative embodiment of a halogen incandescent lamp; and FIG. 4b is a side elevation of the halogen incandescent lamp of FIG. 4a.

Figure 2A:
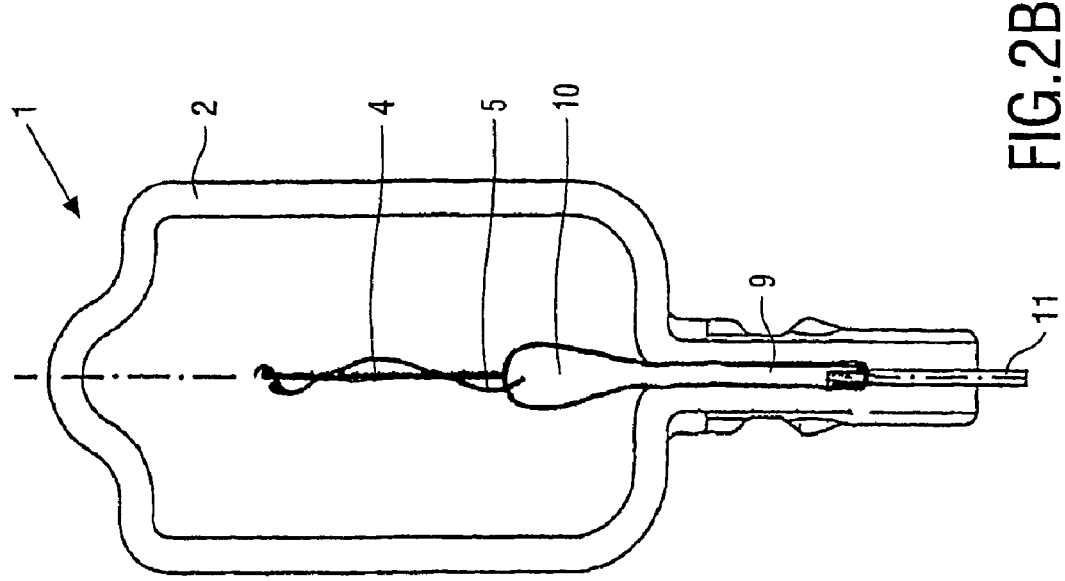
FIG. 2a is a front elevation of an alternative embodiment of a halogen incandescent lamp.

FIGS. 1a and 1b are the front elevation and the side elevation of a halogen incandescent lamp 1 for general lighting purposes which is suitable for direct connection to line voltage, such as a 220V mains. The halogen incandescent lamp 1 has a cylindrical bulb 2 made from quartz glass with an outer diameter of 12.75 mm and an overall length of approximately 45 mm. The inner space of the bulb 2 is filled in a known manner with an inert gas mixture which is known per se, often containing a conventional halogen additive.

The end of the bulb 2 remote from pinch 3 bears a dome which has a remainder of an exhaust tube in the center. The other end of the bulb 2 is hermetically sealed by a pinch 3. The substantially parallel outer surfaces of the single pinch 3, which are produced by the direct action of a pinching tool, are arranged centrally and symmetrically relative to the lamp axis. A plane in which the two ends of the luminous element 4 are located lies centrally in the interior of the pinch 3 so as to be parallel thereto.

The two limbs of the luminous element 4 are bent into the shape of a U, located in the extension of the above-mentioned plane and are arranged symmetrically relative to the lamp axis.

The luminous element 4, consisting of a material customary for halogen lamps such as, for example, tungsten has a luminous and continuously coiled section. Its two ends each have a non-coiled supply lead portion 6, which adjoins directly thereto. The supply leads 6 are partly sealed into the pinch 3 and are connected with electrical conduction to sealing foils 7 embedded in the pinch 3, thus serving for power supply. These two supply leads 6 are arranged parallel to one another in the pinch 3, the sealing foil 7 and a contact pin 8 following each supply lead in alignment, one behind the other. The two contact pins 8 are connected with electrical conduction to the respective sealing foils 7. They are partly embedded in the pinch 3 and partly project from the pinch 3. The two supply leads 6, the two outer sealing foils 7, and the pin contacts 8 form the power supply system of the lamp.

According to FIGS. 1a and 1b, the luminous element is held twice by the support wire 5 in that portion which is arranged transverse to the lamp axis. The coiled and bent support wire 5, which is made of a material customary for halogen lamps, such as molybdenum, is partly sealed and fixed in the pinch 3, substantially axially parallel between the two parts of the power supply system, and is connected with electrical conduction to a central sealing foil 13 embedded in the pinch 3. The center pin 11 is connected with electrical conduction to the central sealing foil 13, and is partly embedded in the pinch 3 and partly projects from the pinch 3. As can be seen in FIG. 1b, the bending line of the support wire 5 lies in a plane which is at right angles to the plane in which the limbs of the luminous element 4 are arranged. At its other end, in the region of the two support points, the support wire 5 is designed as a projecting hook whose opening faces the end of the bulb 2 remote from the pinch.

The metal inner part of the halogen incandescent lamp 1, including the luminous element 4, the center pin 11, the support wire 5, the supply leads 6, the sealing foils 7,13, and the pin contacts 8, constitutes a mechanically stable semi-finished product which was manufactured in one or more mounting steps before the final assembly of the halogen incandescent lamp 1, i.e. in particular the joining together of the glass part and the metal inner parts.

Figure 2B:
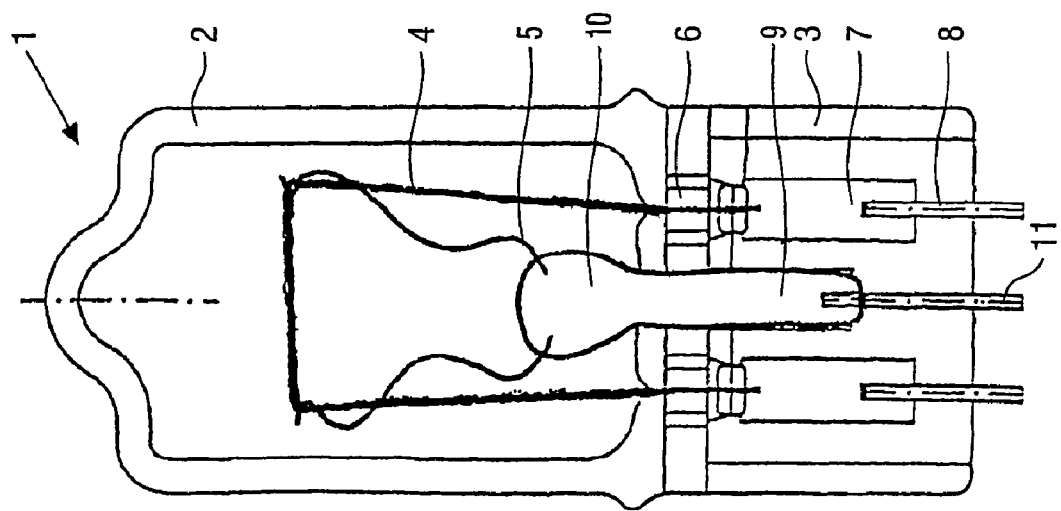

According to FIGS. 2a and 2b, the luminous element 4 is held by two bent metal support wires 5. Support wires 5, preferably made of molybdenum, are designed and bent such that they do not interfere with the upright portions of luminous element 4. The support wires 5 are partly sealed and fixed in a glass pedestal comprising a capillary 9 and a bead 10. The capillary extends substantially in the pinch 3, whereas the bead 10 extends substantially in the inner space of bulb 2. The material of the pedestal may be quartz glass, but preferably is quartz transition glass, which has better wetting and softening characteristics when the support wires 5 are inserted, and matches the material of the bulb 2 when the pedestal is embedded therein. The support wires are inserted in the bead 10, and a center pin 11 is inserted in the capillary 9 when the pedestal is still hot and soft, whereafter the pedestal is cooled down, fixing the metal elements therein. Although the center pin 11 is similar to pin contacts 8, it is electrically isolated from the luminous element 4 and does not act as an electrical conductor. At its other end, in the region of the two support points, the support wires 5 are designed as projecting hooks whose openings face the end of the bulb 2 remote from the pinch.

The substantially metal inner part of the halogen incandescent lamp 1, including the luminous element 4, the glass pedestal 9, 10, the center pin 11, the support wires 5, the supply leads 6, the sealing foils 7, and the pin contacts 8, comprises a mechanically stable semi-finished product which was manufactured in one or more mounting steps before the final assembly of the halogen incandescent lamp 1, i.e. in particular the joining together of the glass pinch/bulb portion and said substantially metal inner part.

Figure 3:
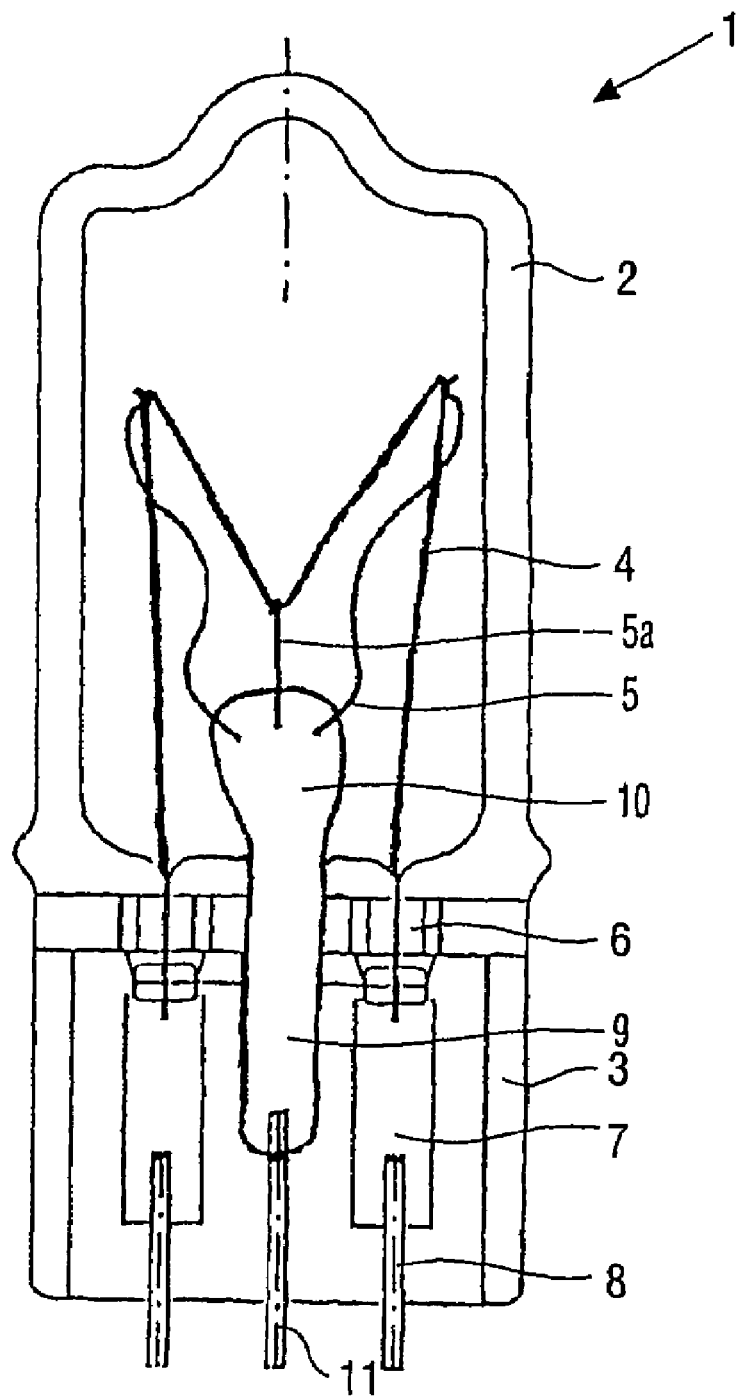
FIG. 3 is a front elevation of a further alternative embodiment of a halogen incandescent lamp.

FIG. 3 is a front elevation of an alternative embodiment of a halogen incandescent lamp, similar to the embodiment in FIGS. 2a and 2b, wherein an extra support wire 5a, which is shorter than support wires 5, retains the luminous element 4. Support wire 5a is also partly sealed and fixed in bead 10 at its one end. At its other end, the support wire 5a is designed as a projecting hook whose opening faces the pinch end of the bulb 2. The central portion of luminous element 4 is thus held in a V-shape, the whole of luminous element 4 being given a W-shape thereby. Those skilled in the art will appreciate that many variations with regard to the shapes of luminous elements and the number and shapes of support wires 5, 5a are possible, including a V-shaped luminous element 4 supported by a single support wire 5, as well as complex three-dimensional shapes. This flexibility in shapes provides a wide range of possible lengths for the luminous element 4, and thus a wide variety of possible lamp powers.

FIGS. 4a and 4b show the lamp according to FIGS. 1a and 1b, but in order to insulate the center pin 11, which is electrically connected to the luminous element 4, the projecting position of the center pin 11, i.e. the portion which extends outside the pinch 3, is removed, and a bead 12 is applied on the pinch 3 in order to cover the opening through which the remaining portion of the center pin 11 is visible. Although bead 12 may be made of a ceramic material, the bead 12 is preferably made of a kind of glass which matches the properties in terms of coefficient of expansion of the quartz glass of which the pinch 3 is made, yet has a lower softening temperature. In particular, the bead is made of a copper-based glass, such as Corning™ batch 901ADY. This copper-based glass has a black color and can be heated by a flame or by focused IR radiation. It can be applied at a temperature of approximately 900-1000° C.

The invention claimed is:

1. A halogen incandescent lamp comprising a transparent sealed bulb (2), a gas filling comprising an inert gas and a halogen additive, a luminous element (4) which is attached to a current supply system (7, 8, 9) extending in a pinched portion (3) of the bulb, and a mount (5, 9, 10, 11, 12, 13) extending from at least adjacent the outside of the pinched portion (3) into the bulb (2) and comprising at least one metal support wire (5) which retains the luminous element (4) in the vicinity of the end of the bulb (2) remote from the pinched portion (3), characterized in that the mount (5, 9, 10, 11, 12, 13) comprises a non-conducting part (9, 10; 12) such that the outer end (11; 12) of the mount (5, 9, 10, 11, 12, 13) at or near the outside of the pinched portion (3) and the support wire (5) are electrically insulated from each other.

2. A lamp according to claim 1, characterized in that the nonconducting part comprises a pedestal (9, 10) which is supported by the bulb (2) or the pinched portion (3) thereof, and that the at least one metal support wire (5) extends from the pedestal (9, 10).

3. A lamp according to claim 2, characterized in that the pedestal (9, 10) extends at least partly in the pinched portion (3).

4. A lamp according to claim 3, characterized in that the pedestal comprises a capillary (9) substantially extending in the pinched portion (3) and a bead (10) substantially extending inside the bulb (2).

5. A lamp according to claim 2, characterized in that the pedestal (9, 10) is substantially made of glass.

6. A lamp according to claim 2, characterized in that the bulb is made of a quartz glass and the pedestal is made of a quartz transition glass.

7. A lamp according to claim 2, characterized in that the mount comprises two, three or more metal support (5) wires extending from the pedestal (9, 10).

8. A lamp according to claim 1, characterized in that the nonconducting part comprises a bead (12), preferably made of glass, more preferably made of a copper-based glass, which is applied to the outside of the pinched portion (3).

9. A method of manufacturing a halogen incandescent lamp, the lamp comprising a transparent sealed bulb (2), a gas filling comprising an inert gas and a halogen additive, a luminous element (4) which is attached to a current supply system (7, 8, 9) extending in a pinched portion (3) of the bulb, and a mount (5, 9, 10, 11, 12, 13) extending from at least adjacent the outside of the pinched portion (3) into the bulb (2) and comprising at least one metal support wire (5) which retains the luminous element (4) in the vicinity of the end of the bulb (2) remote from the pinched portion (3), the mount (5, 9, 10, 11, 12, 13) comprising a non-conducting part (9, 10; 12) such that the outer end (11; 12) of the mount (5, 9, 10, 11, 12, 13) at or near the outside of the pinched portion (3) and the support wire (5) are electrically insulated from each other, and the nonconducting part comprising a bead (12) the method comprising the step of applying the bead to the outside of the pinched portion (3), characterized in that the part of the mount (5, 11, 13) which extends outside the pinched portion (3) is substantially removed before the bead (12) is applied.

10. A method of manufacturing a lamp according to claim 9, characterized in that the bead (12) is heated by IR radiation in order to apply the bead (12).

* * * * *